Aug. 16, 1949.　　　E. F. CHAMPAYGNE　　　2,479,471
HIGH-TEMPERATURE X-RAY DIFFRACTION CAMERA
Filed Feb. 3, 1945　　　3 Sheets-Sheet 1
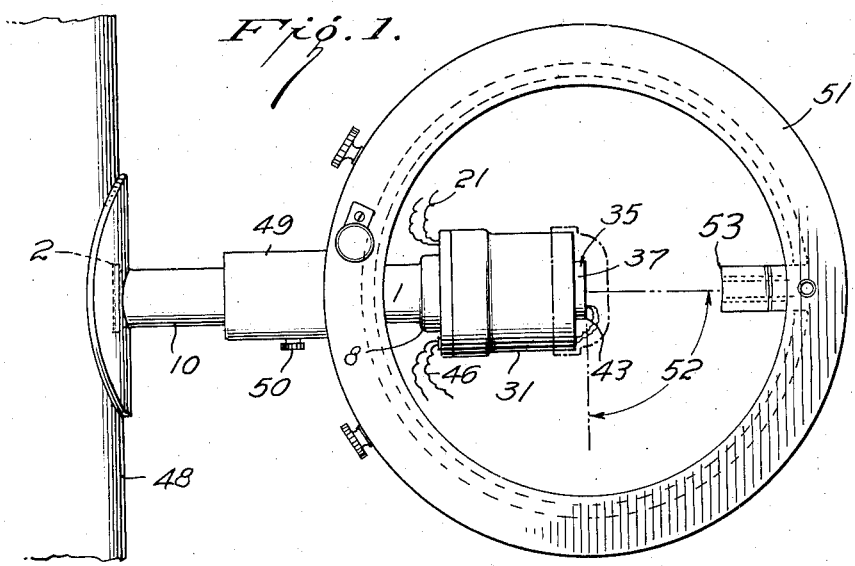
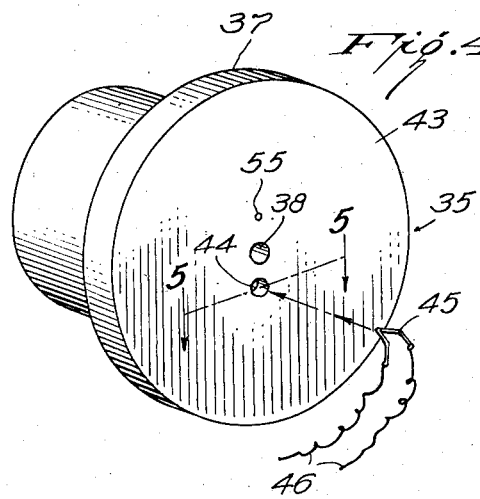
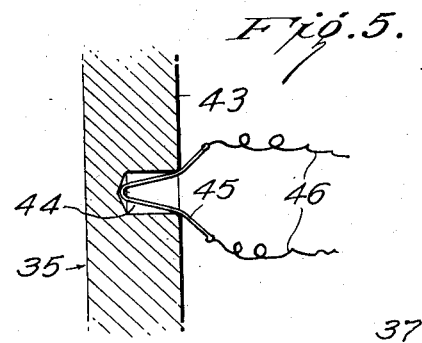
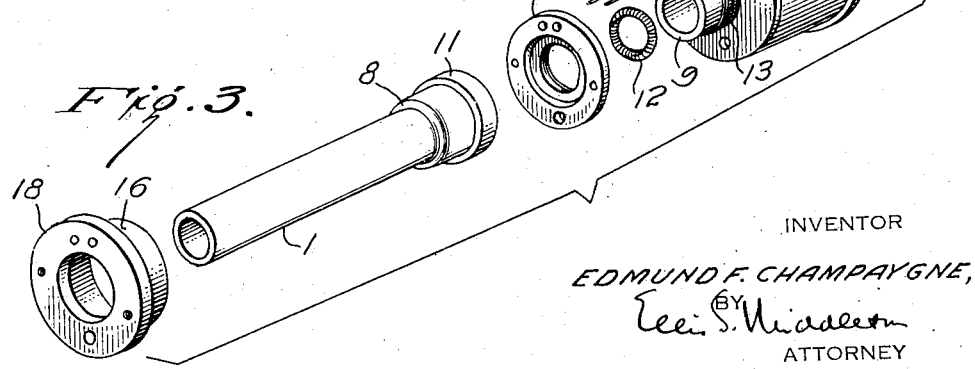
INVENTOR
EDMUND F. CHAMPAYGNE,
BY
ATTORNEY Aug. 16, 1949.  E. F. CHAMPAYGNE  2,479,471
HIGH-TEMPERATURE X-RAY DIFFRACTION CAMERA
Filed Feb. 3, 1945  3 Sheets-Sheet 2
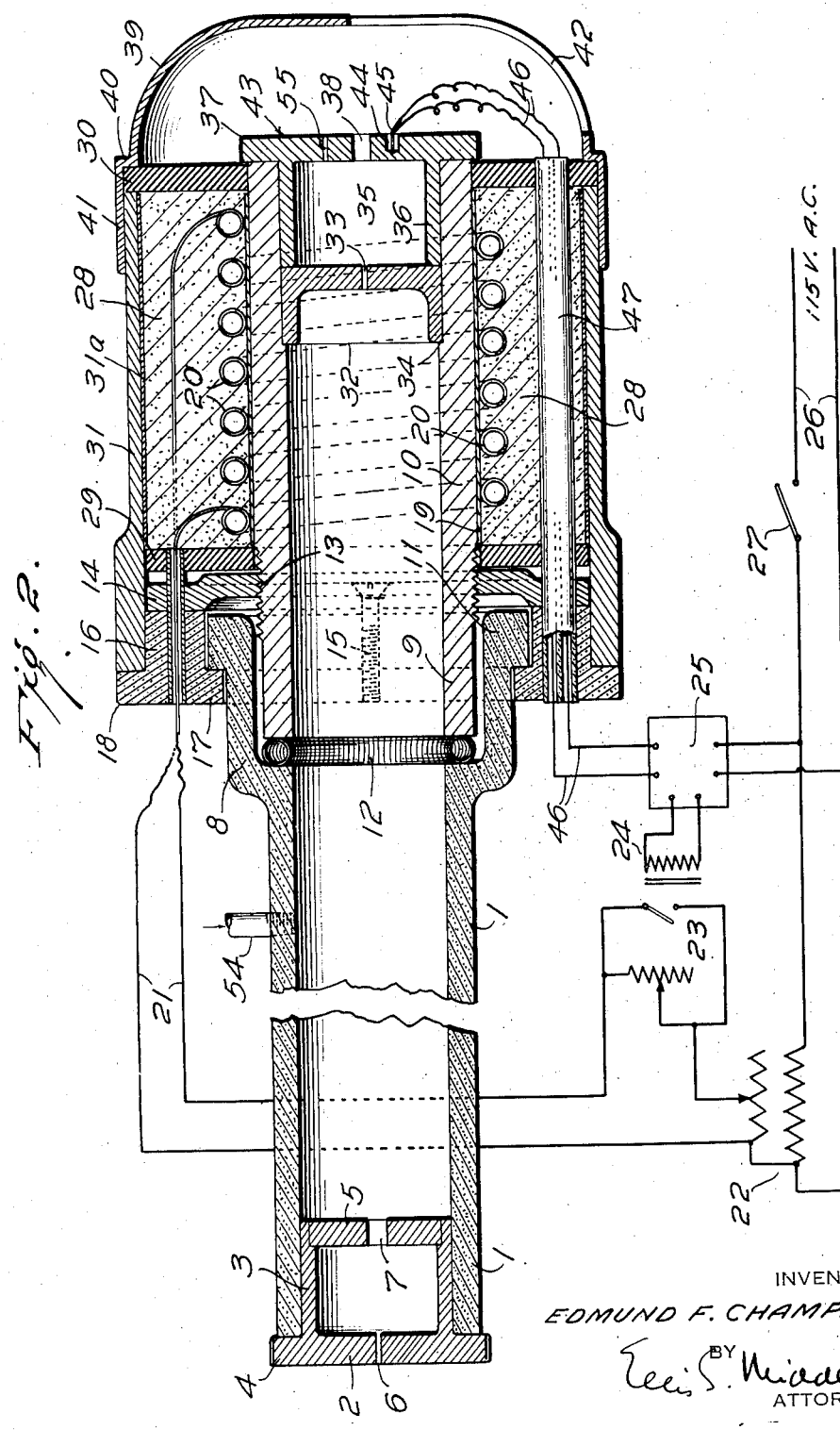
INVENTOR
EDMUND F. CHAMPAYGNE,
BY
ATTORNEY

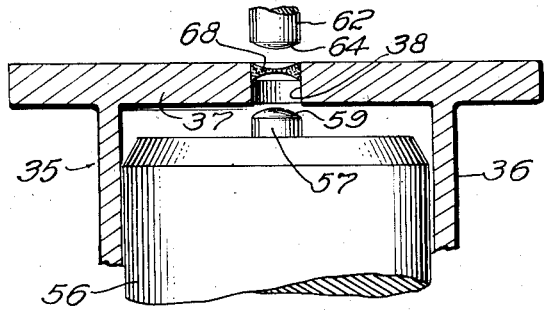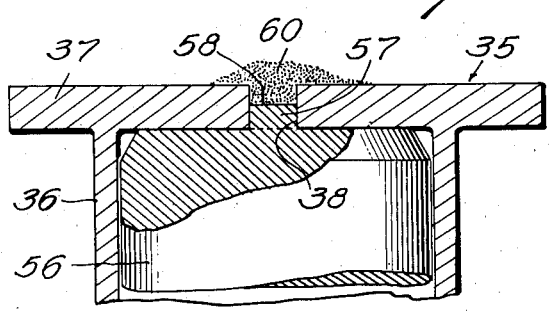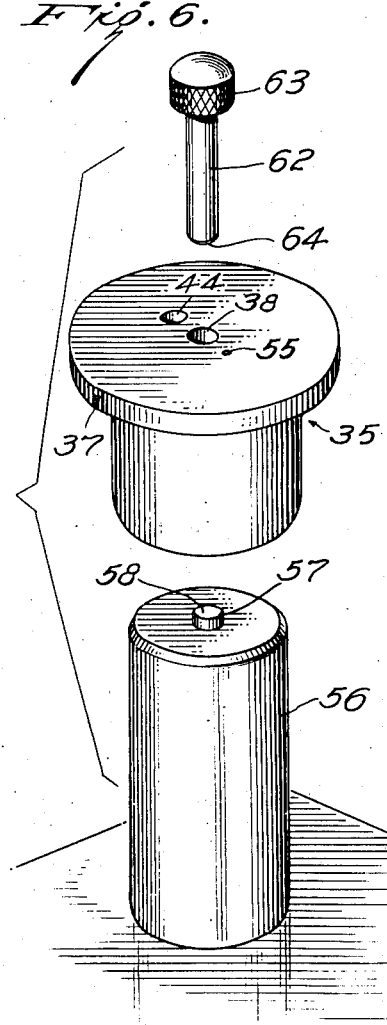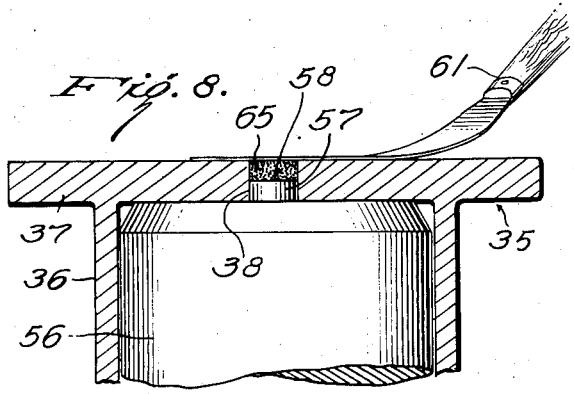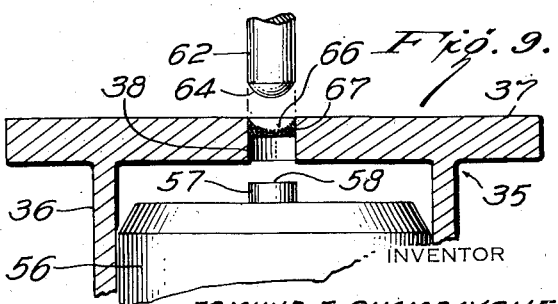

Patented Aug. 16, 1949

2,479,471

UNITED STATES PATENT OFFICE 2,479,471

HIGH-TEMPERATURE X-RAY DIFFRACTION CAMERA

Edmund F. Champaygne, Noroton Heights, Conn., assignor to American Cyanamid Company, New York, N. Y., a corporation of Maine Application February 3, 1945, Serial No. 576,091

1 Claim. (Cl. 250—53)

The present invention relates to a camera in which photographs may be taken of the high temperature X-ray diffraction patterns of solid polymorphic inorganic substances.

Cameras of this type are not new, but a standard construction depends for heating of the sample undergoing study by rays reflected from a heat source. Such a mode of operation is unsatisfactory in that erratic and uncontrollable heating of the sample results. This is a fatal defect in prior art cameras because many times it has been found that the transition point of solid polymorphic inorganic materials from one amorphous form to another occurs between fractions of degrees of temperature, and therefore unless the temperature of the sample can be satisfactorily controlled both from the standpoint of maintenance and change, an inaccurate conclusion as to transition temperatures follows.

Cameras of this type which rely upon reflected heat to raise the temperature of the sample undergoing study necessarily require a considerable input of power and the filament used as the source of heat is subject to deterioration and consequently has a short life.

The principal object of the present invention is to provide a camera for the above purpose which transmits the heat from a suitable source to the sample by conduction rather than radiation, as it has been found that under these circumstances, the temperature of a sample may be readily maintained at a fraction of a degree for long periods of time and this temperature may be raised or lowered in the same order of magnitude accurately and quickly.

Another important object of the invention resides in the construction of a camera of the above type which will be of durable material, considering that it must operate at comparatively high temperatures, the maximum of which is of the order of 600° C. which will have no manufacturing difficulties and permit of ready assembly or disassembly for the adjustment or repair of parts when needed.

To this end the invention contemplates a sample holder in good heat conducting contact with a heat transmission barrel receiving its heat from an electrical resistance element in close proximity thereto, the heat element being so arranged as to minimize heat loss through radiation and consequently damage to the X-ray photographic sensitive surface held in the usual cylindrical film cassette surrounding the device. The invention further contemplates the construction of the various parts of materials eminently suitable for the purpose.

The invention further includes the novel construction, arrangement and combination of parts more fully hereinafter described and shown in the accompanying drawings in which:

Fig. 1 is a side view showing the film cassette and its relation to the diffraction beam under study;

Fig. 2 is a sectional elevation of the collimating tube, sample holder and associated parts showing a preferred electrical hook up;

Fig. 3 is an exploded perspective showing one method of assembly of the major parts of Fig. 2;

Fig. 4 is a perspective view of a sample holder;

Fig. 5 is a fragmentary sectional view on line 5—5 of Fig. 4 on an enlarged scale;

Fig. 6 is an exploded perspective view of the sample holder, plug and rod used in forming the sample undergoing study;

Fig. 7 is a fragmentary sectional view of a sample holder showing a sample being formed;

Fig. 8 is a similar view showing the next step;

Fig. 9 is a similar view showing a formed sample; and

Fig. 10 is a similar view showing a modified sample.

Referring now with particularity to the embodiment illustrated, an X-ray collimating tube is shown at 1, preferably of soapstone because of its reasonable heat resisting and insulating properties as well as its machinability. This tube is adapted to receive at the X-ray entry end the usual restrictor device 2 having a telescoping portion 3 closely fitting the inside of the collimating tube and provided with a flange 4 abutting the end thereof. A lead or otherwise X-ray opaque shield 5 is located within the inner periphery of the telescoping portion 3 and the face of the restrictor 2 and the lead shield 5 are provided with primary and secondary restricting apertures 6 and 7, respectively. As is usual in devices of this character, the secondary aperture 7 is co-axial with the primary aperture 6 and slightly larger in diameter in order to transmit therethrough parallel X-rays entering the aperture 6 with minimum scattering.

The open end of the collimating tube 1 is provided with a bell shaped extension 8 overlying the end portion 9 of a heat transmission barrel 10 preferably of stainless steel and provided with a terminal annular outwardly projecting flange 11. As shown, the end 9 of the barrel 10 extends telescopically within the bell 11 of the collimating tube in a loose fit with an expansion element between the collimating tube and the heat transmission barrel which may conveniently take the form of a spring 12 of coiled nichrome wire or the like.

Barrel 10 is provided with a raised threaded portion 13 to receive the interiorly threaded ring 14, preferably of stainless steel or the like which is secured as by machine screws 15 to an annular transite collar 16 having a projecting flange 17.

As shown, the inwardly projecting flange 17 on the collar 16 abuts and engages the flange 11 on the bell of the collimating tube 1 which also holds the end 9 of the heat transmission barrel 10 against the expansion spring 12 upon proper relative movement between the barrel 10 and the threaded ring 14.

The main body of the barrel 10 may be wrapped with a layer 19 of electrical insulation such as mica or asbestos upon which is wound an electrical resistance element 20 of a size and extent sufficient to raise and maintain the sample at a desired temperature, say up to 600° C. The ends of the resistance element 20 are connected through electrical leads 21 through a variable voltage transformer 22 stepped down to about twenty-five volts, a bleeder resistance element 23 for maintaining the temperature of the sample within close limits after the desired temperature has been reached, and an external relay 24 to a potentiometer controller 25 to which an E. M. F. from a 115 volt A. C. source is flowed by means of leads 26 through proper manipulation of switch 27. Thus any degree of heat may be obtained, maintained, and adjusted within the limit of the heating elements which limit may conveniently be approximately 600° C. Obviously, a device may be constructed to obtain higher or lower temperatures as desired by merely changing the type of heating element and/or the character of the E. M. F. supplied thereto.

Insulation 28 is provided for embedding the resistance wires 20 and to prevent loss of heat in a radial or outward direction. This insulation may take the form of powdered or flaked asbestos although preferably it consists of a set packing of firebrick cement. In order to confine the insulation, transite washers 29 and 30 are provided, the latter being of a greater radial extent than the former so as to abut and hold in place an aluminum housing 31 held between the washer 30 and the flange 17 of the transite collar 16. Thus the washer 29 and the housing 31 may serve as forms during the packing of the insulation material 28 after which the washer 30 may be put in place. It is preferable that the inner surface of the aluminum housing 31 be polished or a supplemental reflector 31a provided so as to reflect any heat reaching it from the inside back into the device.

A cylindrical restrictor 32, preferably of stainless steel, having a restricting aperture 33 and engaged against an annular shoulder 34 machined on the inside of the barrel 10.

A metallic sample holder is shown at 35 preferably of stainless steel having cylindrical portion 36 telescopically and closely engaging the inside of the barrel in good heat conduction contact therewith. As shown the end of the cylindrical portion 36 of the sample holder abuts the guard 32 and holds the latter in fixed position. The sample holder is also provided with an outwardly projecting flange 37 abutting the end of the barrel 10. The sample holder is also provided with an aperture 38 in which the sample undergoing study through its diffraction pattern may be mounted. It is, of course, important that the apertures 6, 7, 33 and 38 be co-axial and arranged for the transmission therethrough of parallel X-ray beams from any suitable source (not shown).

An aluminum cap 39 having shoulder 40 is fitted over the end of the device so that the shoulder engages the edge portion of the washer 30 and an enlarged cylindrical portion 41 overlies the housing 31 in a close frictional fit. The cap 39 is provided with a radial slot 42, the upper end of which is coincident with a horizontal line drawn outwardly from the upper inside surface of the sample receiving aperture 38, and the other end of the slot is coincident with a vertical line drawn downwardly and across the outer face 43 of the sample holder.

A thermocouple well 44 is provided in the sample holder as close to the sample receiving aperture 38 as possible and a thermocouple 45 is located therein and provided with leads 46 which pass through apertures in the transite washer 30 preferably through tube 47 embedded in the insulation 28 and suitable apertures in the washer 29, ring 14 and collar 16. These leads are then properly connected to the potentiometer controller as is usual in such cases. As thus arranged the thermocouple and its leads may be readily removed for replacement or repair without disturbing the other parts with the exception of the removal of the aluminum cap 39.

In assembling the collimating tube and the parts within the housing 31 and cap 39, the following procedure may be used:

The collar 16 is slipped over the left-hand end of the collimating tube until the flanges 17 and 11 abut, the expansion spring 12 is put in place, the barrel 10 inserted and the ring 14 threaded onto the barrel against the collar until the apertures through which the leads 21 of the resistance element 20 pass are in alignment. The machine screws 15 are then put in place to secure the collar 16 and the ring 14 together. Proper rotation of the barrel 10 will then cause the flanges 17 and 11 to be in close engagement against the tension of the spring 12. The washer 29 is then slipped over the barrel from the right-hand end thereof until it abuts the ring 14 and the apertures for the leads 21 to the resistance 20 are in proper alignment. The mica or asbestos wrapping for the barrel is then put in place and the resistance 20 assembled so that its leads 21 pass through the aligned apertures in the washer 29, ring 14 and collar 16. The housing 31 is then slipped over the washer 29 and the ring 14 so that its end abuts the flange 17 on the collar 16. The insulating packing 28 is then put in place and closed by the washer 30.

Following this operation the restrictor 32 is inserted inside of the barrel 10, the sample holder 35 containing its prepared sample inserted in the end of the barrel until the flange 37 of the former engages the end of the latter, the thermocouple 45 placed into its well and its leads 46 passed through the washer 30, the tube 47 and aligned apertures in washer 29, ring 14 and collar 16 and properly connected to the potentiometer controller 25. The aluminum cap 39 is then placed in position so that the slot 42 is in the proper location to permit projection of the diffraction pattern of the sample in the aperture 38 upon the film.

Fig. 1 shows the general relationship between the X-ray tube stack, the source of X-ray radiation, the sample holder, heater and collimating tube assembly and the film cassette. In this figure the stack is shown at 48 which is of conventional design housing, a usual source of X-ray radiations which are projected through the collimating tube 1 held in an annular hub 49 as by set screw 50. The hub is a part of the standard and well known cylindrical film cassette indicated generally at 51 which is provided with the usual cyclindrically arranged X-ray sensitive surface.

The assembly including the aluminum housing 31 is so arranged within the film cassette that a portion of the axis of the cassette lies in the plane of the outer face 43 of the sample holder, the parts being so positioned that the diffracted X-ray pattern projected through the slot 42 in the cap 39 extends through the 90 degree arc 52 onto the film in the cassette. As usual, the zero beam is caught within a well 53 mounted on the cassette the bottom of which is made of X-ray opaque material so as to provide minimum interference between the zero beam and the useful diffracted beam to be studied.

Where the sample of material undergoing study and held in aperture 38 is subject to change due to oxidation or reduction, it may be desirable to maintain it in an atmosphere of either an inert, reducing or oxidizing gas as the case may be. In such cases, a gas inlet 54 in the wall of the collimating tube may be provided and a gas outlet 55 in the sample holder through which a gas of any desired character may be passed.

In the investigation of polymorphic powder or crystals of inorganic materials through study of their X-ray diffraction patterns at high temperature, it is desirable that a sample be mounted in the sample holder in such a way as will insure the production of a sharp diffraction pattern brought about by the use of as thin a sample as possible. Two preferred modes of mounting a sample are shown in Figs. 9 and 10.

In one form, a plug 56 having axially projecting stud 57 is inserted inside of the sample holder 35 so that the stud projects within the sample receiving aperture 38 a desired distance. The top of this stud may be flat as at 58 or it may be convex as at 59, dependent upon the desired shape to be given to the back side of the final specimen mounted in the aperture 38. In either event, a portion 60 of the material undergoing investigation is placed on the sample holder 35 in a quantity sufficient to more than fill the remaining portion of the aperture 38 and smoothed off as by spatula 61. Then while retaining the plug 56 and its stud 57 in place, a rod 62 having a knurled finger grip 63 and a convex end 64 is impressed into the loose powder 65 with oscillation so as to form a concavity 66 due to the curvature of the end 64. This then leaves the final sample as shown at 67 in Fig. 9 upon removal of the plug 56. It is desirable, of course, that the smallest thickness dimension of the sample 67 be such that a sharp diffraction pattern may be obtained.

In order to render adequate strength to the bridged sample thus produced and to prevent its accidental displacement during handling incident to mounting in the complete device, it may be desirable to use a plug 56 having a stud with a convex face 59 thereon. Under these circumstances and manipulating the loose sample as before a bridged sample 68 is produced which is concave on each side. This type of bridged sample is stronger than the sample 67 as a supporting arch is formed on each side thereof.

Having thus formed a sample, it only becomes necessary to insert the sample holder 35 into the end of the heat transmission barrel 10 of the assembly and proceed as before.

This application is related to applicant's copending application Serial No. 576,092.

While the invention has been described with particular reference to specific embodiments, it is to be understood that it is not to be limited thereto but is to be construed broadly and restricted solely by the scope of the appended claim.

What is claimed is:

In a high temperature X-ray diffraction camera including a metal sample holder having a sample receiving aperture and an outer face, a metal heat transmission barrel in heat conduction contact therewith, a heating element in proximity to the heat transmission barrel and insulated against outward heat radiation in a radial direction, and an X-ray collimating tube co-axial with the heat transmission barrel and the sample holding aperture in the sample holder and means to pass a gas through the collimating tube, heat transmitting barrel and sample holder.

EDMUND F. CHAMPAYGNE.

REFERENCES CITED

The following references are of record in the file of this patent:

UNITED STATES PATENTS

| Number | Name | Date |
|---|---|---|
| 1,546,349 | Hull | July 14, 1925 |
| 2,341,108 | McLachlan | Feb. 8, 1944 |

OTHER REFERENCES

"Structure of Metals," Barrett, published by McGraw-Hill Book Co., Inc., New York, N. Y., 1943, pp. 119–120.

"Journal of Applied Physics," vol. 14 (Mar. 1943), page 137.